United States Patent [19]
Yilgör et al.

[11] Patent Number: 5,521,273
[45] Date of Patent: May 28, 1996

[54] WATERPROOF, MOISTURE VAPOR PERMEABLE POLYMERS, FILMS AND COATED TEXTILES AND OTHER MATERIALS

[75] Inventors: Iskender Yilgör; Emel Ö. Yilgör, both of Midlothian, Va.

[73] Assignee: Th. Goldschmidt AG, Essen, Germany

[21] Appl. No.: 416,408

[22] Filed: Apr. 4, 1995

Related U.S. Application Data

[62] Division of Ser. No. 320,281, Sep. 15, 1994, Pat. No. 5,461,122, which is a division of Ser. No. 14,308, Feb. 5, 1993, Pat. No. 5,389,430.

[51] Int. Cl.$^6$ ................................................. C08G 18/10
[52] U.S. Cl. ............................. 528/66; 528/65; 528/76
[58] Field of Search ......................... 528/65, 66, 76

[56] References Cited

U.S. PATENT DOCUMENTS

| | | | |
|---|---|---|---|
| 4,686,137 | 8/1987 | Ward, Jr. et al. | 428/290 |
| 5,120,813 | 6/1992 | Ward, Jr. | 528/28 |

*Primary Examiner*—Christopher W. Raimund
*Attorney, Agent, or Firm*—Anderson Kill Olick & Oshinsky

[57] ABSTRACT

A water vapor-permeable, waterproof adhesive polymer and a linear polyurethane-urea polymer, either alone or in combination with one another, are utilized to coat various textile materials. The compositions of these polymers as well as various methods of coating the textile materials are described.

5 Claims, No Drawings

WATERPROOF, MOISTURE VAPOR PERMEABLE POLYMERS, FILMS AND COATED TEXTILES AND OTHER MATERIALS

This is a divisional application of Ser. No. 08/320,281, filed Sep. 15, 1994, now U.S. Pat. No. 5,461,122, which in turn is a divisional application of Ser. No. 08/014,308, filed Feb. 5, 1993 now U.S. Pat. No. 5,389,430.

FIELD OF INVENTION

The present invention is directed to water vapor-permeable, waterproof polymers as well as the use of these polymers, either alone or in combination with one another, as a coating. The invention also describes the coated textile materials as well as methods of coating and obtaining coated textile materials.

BACKGROUND INFORMATION AND PRIOR ART

Moisture vapor permeable backing materials having a moisture vapor permeable pressure sensitive adhesive are disclosed by Hodgson in U.S. Pat. No. 3,645,835. The backing materials disclosed therein are synthetic polymers which are continuous and nonpermeable to liquid water. The adhesive materials are also permeable to moisture vapor. There is no disclosure of a discrete segmented block copolymer additive to either the backing material polymer or the adhesive material polymer to increase the moisture vapor transmission capability.

Other materials have been suggested for use as additives to polymers used in bio-medical devices, however, not for the purpose of enhancing moisture vapor transmission. For example, Nyilas in U.S. Pat. No. 3,562,352 suggests crosslinked thermosetting polysiloxane-polyurethane block copolymers for use as blood contact surfaces of bio-medical devices. The technique disclosed therein includes fabricating the entire blood contacting device from such block copolymers or coating such devices with the copolymers.

Minor amounts of block copolymers including segments of polydimethylsiloxane and blocks of polycarbonate, polystyrene, poly-(2,6-diphenyl-1,4-phenyleneoxide), and polyamide-imide have been blended with base homopolymers for modifying the surface properties of the homopolymers. Gaines, et al. in U.S. Pat. No. 3,961,122 suggest using such surface modified polymers as thin films while Gaines, et al. in U.S. Pat. No. 3,686,355 suggest a variety of uses, including bulk uses.

Flexible, soil resistant sheet material comprising a fibrous mat covered with a polyurethane composition is disclosed in U.S. Pat. No. 3,423,359. The polyurethane composition contains 0.1 to 5% of a surface active agent comprising a polyethylene oxide hydrophilic component and a hydrophobic component selected from polyalkylene oxides (except polyethylene oxides), aliphatic polyesters and mixtures thereof. No hydrophobic soft blocks such as polydialkylsiloxanes are disclosed as part of the surface active agent.

Block copolymers useful in the treatment of fibrous materials to improve soil release properties are disclosed in U.S. Pat. No. 3,565,845. The block copolymers are not mixed with a base polymer when used to treat the fibrous materials.

Holker et al., U.S. Pat. No. 4,367,327, disclose "a monolithic, breathable polyurethane textile coating." However, the invention is directed to a limited composition of matter claims and as a result, in actual commercial applications, there are some serious shortcomings. It discloses only one polyurethane that is used both as the top coat and the adhesive and is based only on polyethylene oxide glycol (PEO) soft segments. The use of a trifunctional isocyanate as a crosslinker is also claimed. In actual applications, since the inventive medium has only the hydrophilic PEO in its backbone, the coating swells too much, especially during washing. This leads to delamination from the fabric. In contrast, the present invention has two chemically different compositions as the adhesive and the top coat is based on at least three soft segments, can use a diisocyanate as well as a polyisocyanate as a crosslinker during coating and, in addition, has different coating formulations involving stabilizers, surface active additives, etc. to obtain a premium performance from the coated fabric.

Ward et al., U.S. Pat. No. 4,686,137, is directed only to the coated fabric. It also uses only one polyurethane composition as the adhesive and the top coat. It does not describe the coating formulation (crosslinkers, etc.). The coating polymer described has at least one hard segment (urea or urethane) and at least one hydrophilic (PEO) and one hydrophobic soft block (polytetrahydrofuran, also called "PTMO"). Furthermore, the polymer may contain up to 2% by weight polydimethylsiloxane (PDMS). A superficial structural similarity between the structure described in Ward et al. and that in the present application is deceiving as the preferred polymers in the present application are cycloaliphatic 4,4-bis(isocyanatocyclohexyl)methane (HMDI) based instead of aromatic p,p'-diphenylmethane diisocyante (MDI) and the chain extender is preferably a long chain branched diamine instead of short ethylene diamine (ED) or 1,4-butanediol (BD). In addition, the present invention clearly distinguishes between a top coat and an adhesive polymer and describes a well defined coating formulation. The amount of PDMS in the top coat polymer is greater than 2% by weight. The adhesive layer has reactive end groups. In addition, in actual commercial applications, the Ward system does not perform as described. Even if one crosslinks the structure shown in Ward during coating, it still does not perform, especially due to high surface tackiness and poor washability.

Ward et al, U.S. Pat. No. 5,120,813, is similar to the Ward '137 patent; only the claims are directed to the polymer composition and to the films. No improvement over the '137 system is achieved.

Uhlmann et al., U.S. Pat. No. 4,052,495 describe a method to prepare "release compositions" for non-cellular polyurethanes using low levels (0.5–5% by weight) of siloxane alkylene oxide copolymer additives. In contrast, the present invention is directed to achieve exactly the opposite result, i.e., to permanently bond a polyurethane formulation onto a substrate.

Pechhold, U.S. Pat. No. 4,120,850 describes a polyurethane prepared by using a "copolymer of tetrahydrofuran and ethylene oxide or propylene oxide containing 20–70% ethylene oxide" as a soft segment together with a diisocyanate (MDI) and a diol (1,4-butanediol or hydroquinone-β-hydroxyethyl ether) as a hard segment. All reactions are carried in bulk.

The present application, in contrast, has PTMO and PEO, together with at least another soft segment but these segments are always separated from each other with a diisocyanate or a hard segment group. They are never directly linked to one another. Furthermore, in terms of field of applications, Pechhold never mentions coated fabrics.

Matsumoto et al., U.S. Pat. No. 4,945,149, claim a coating composition for forming a substantially non-porous moisture permeable coating layer or fiber of a hydrophilic polyurethane resin comprising an isocyanate terminated prepolymer with a viscosity of <10,000 cps (no solvent) and a curing agent which is a diol or diamine. In contrast, the present invention has a high molecular weight polymer which is not isocyanate end capped. Moreover, no unreacted isocyanate is left in the present system that has, if any (as in the adhesive), hydroxyl end groups.

Sakhpara, U.S. Pat. No. 4,924,214, describes a system similar to Matsumoto above. It claims an isocyanate terminated low viscosity prepolymer based on poly (alkylene oxide) glycol soft segments. No other soft segments are utilized. No chain extenders are used or claimed. The main concern of the invention is the viscosity of the 100% active system (no solvent is used).

Driskill et al., U.S. Pat. No. 4,925,732, describe a breathable adhesive, fabric coating prepared by using the adhesive and a microporous poly(tetrafluoroethylene), and applications of the laminates. The adhesive described has only one component, i.e., a hydrophilic block polyurethane consisting of PEO soft segments (Mn 600 to 3500 g/mole), a hard segment consisting of a polyisocyanate and a chain extender that has a molecular weight of less than 500 g/mole and optionally a chain terminator. The laminates described are not stretchable in contrast to the laminates in the present application.

Gould et al., U.S. Pat. No. 5,120,816, describe a polyurethane urea polymer and the application of the non-crosslinked film formed from the polymers in the medical field. No textile coatings are described or claimed. Moreover, the film formed in Gould is used as is, whereas in the present invention, it is always preferred to have a fabric substrate.

Rautenberg et al., U.S. Pat. No. 4,761,324, describe the preparation of a laminated elastic fabric coated with a breathable, stretchable polyurethane film using a discontinuous adhesive. They do not have any (well defined) compositional claims on the laminate or the adhesive. The product has very poor breathability as further evidenced by the need to put a very thin layer of the top coat. In addition, Rautenberg requires the use of a discontinuous adhesive (which is not breathable) in contrast to our solid continuous film. The present invention is not limited to a thickness of <25 microns, either.

Waterproof, moisture vapor permeable (breathable) textile coatings have become a very important part of our daily lives due to the comfort provided by these materials. Applications of these coated fabrics cover a wide range of diverse fields, including but not limited to the following listed below:

i. outdoor garments, such as sportswear and activewear (e.g., light jackets, jogging suits, skiwear, etc.), ii. heavy duty rainwear (e.g., policemen, postal carriers), iii. industrial clean room garments (such as electronics and pharmaceutical production facilities), iv. breathable, fluid barrier medical garments (such as surgical garments, bedsheets, surgical drapes, etc.), v. protective military garments, vi. tents and sleeping bags, vii. wound dressings, viii. protective marine (yacht and boat) covers, ix. natural and synthetic leather coatings, x. glove inserts, xi. shoe insulation.

In principle, there are two different kinds of waterproof, breathable polymeric textile coatings. The first types, which are also termed "microporous coatings," provide breathability due to the presence of tiny pores present in the films. These pores are too small for water droplets to go through, however, large enough for water vapor to pass, thus providing a waterproof, moisture permeable membrane. The second type, or next generation of breathables, are called "monolithic coatings." They are solid films (not having any micropores) and therefore they are impermeable to water. Their breathability comes from the specific design of their molecular structure and molecular architecture.

Examples of microporous, waterproof, breathable textile coatings include:

| Gore-Tex | Microporous Tetrafluorethylene | W. L. Gore, USA |
|---|---|---|
| Entrant | Microporous Polyurethane | Toray, Japan |
| Ultrex | Microporous Polyurethane | Burlington, USA |
| Breathe | Microporous Polyurethane | UCB, Belgium |
| Exeltech | Microporous Polyurethane | Unitika, Japan |
| Celtech | Microporous Poly(amino acid) | Unitika, Japan |

Examples of monolithic, waterproof, breathable textile coatings include:

| Sympatex | Monolithic Polyester | Akzo, Netherlands |
|---|---|---|
| Witcoflex | Monolithic Polyurethane | Baxenden, U.K. |
| Bion-II | Monolithic Polyurethane | Goldschmidt, Germany |

In addition to being waterproof and highly moisture vapor permeable, there are many other requirements for these coatings depending on the field of application and/or the substrates they are coated on. As an example, when highly stretchable "Lycra-Spandex" is used as a substrate for these coatings, the coating itself must (at least) stretch as much as "Lycra-Spandex". When applied on reusable medical garments, the coating must be stable against washing with hot water and bleach and also must be steam sterilizable for up to 50 cycles or more. Most of the products on the market, including the coatings listed above, are not suitable for such applications.

In addition to the performance requirements of the coated fabrics, there are also many process related requirements during the commercial coating process which eventually determine the quality, aesthetics and the overall performance of the system. The following is a list of various performance related requirements from these waterproof, moisture vapor permeable coatings:

1. high water vapor transmission rate,
2. totally waterproof (also impermeable to other fluids, especially blood),
3. soft, dry touch,
4. good film strength (mechanical integrity),
5. good adhesion to the fabric,
6. highly stretchable,
7. good drape,
8. machine washable (including industrial washing with hot water and bleach),
9. dry cleanable,
10. good overall durability (abrasion resistance, thermal, hydrolytic, oxidative and ultraviolet stability),
11. windproof,
12. lightweight,
13. fire retardant,
14. barrier to microbes and/or other microorganisms (medical applications),
15. good sewability, 16. tapeability of the seams.

Process related requirements during commercial coatings:
1. Adjustable to various coating techniques
   i. direct coating,
   ii. transfer coating,
   iii. lamination,
   iv. spray coating,
   v. dipping.
2. Easily compoundable with
   crosslinkers or curing agents (e.g., polyisocyanates, aziridines),
   pigments (e.g., titanium dioxide),
   fillers (e.g., carbon black),
   other specialty additives (e.g., antimicrobial agents, flame retardants),
   levelling agents (e.g., silica),
   surface active agents (e.g., silicone oil, fluorochemicals),
   stabilizers (e.g., thermal, hydrolytic, oxidative and ultraviolet stabilizers).
3. Ease of applicability to various fabrics:
   woven,
   non-woven,
   knit,
   melt blown substrates.

It is fairly difficult to combine all these properties into one coating material. For example, although microporous tetrafluoroethylene (e.g., "GoreTex") has very good breathability and waterproofness, it is not stretchable. Similarly, the monolithic polyester ("Sympatex") suffers from poor stretchability. Commerically, these two materials are offered as thin films so can only be coated onto the fabric by lamination. It is also impossible to compound these materials with various additives listed above since they are offered as ready-to-laminate films. Microporous products in general also suffer from being poor barriers to various microorganisms. Another weakness of the presently available waterproof, breathable textile coatings (from respective technical data sheets and hang-tags) is the fact that they can be machine washed only with warm water (usually, about 40° C.) and with a mild detergent (without bleach). They can be tumble-dried at fairly low temperatures. However, as we have discussed above, especially for medical applications, one does not only need to wash them with hot water and with the presence of bleach, but also to steam sterilize them at temperatures exceeding 120° C.

OBJECT OF THE INVENTION

An object of the present invention is a water vapor-permeable, waterproof adhesive polymer and a water vapor-permeable, waterproof linear polyurethane-urea polymer.

Another object of the invention is utilizing these polymers, either alone or in combination with one another, as a coating. The coated textile materials as well as various methods of coating and obtaining coated textile materials are other objects of the present invention.

Generally, it is an object of the present invention to improve on the art of water vapor-permeable, waterproof textile materials as hitherto practiced.

The new product described in the present application tries to combine most of the above properties and benefits into one system. As clearly demonstrated in the examples provided, a system superior to all others was achieved in overall performance. In order to achieve this, a two-component coating system consisting of a breathable polyurethane adhesive and a breathable polyurethaneurea top coat is prepared.

The inventive two-component coating system described here offers several major advantages over others available on the market in terms of overall performance.

First, since the polyurethanes are produced in solution they can easily be compounded with many different additives at desired levels before applying onto the fabric. These include crosslinkers and curing agents, pigments and colorants, fillers, antimicrobial agents, flame retardants, levelling agents, surface active agents, stabilizers (thermal, hydrolytic, oxidative, UV), etc. This provides a very broad flexibility to the coater in his formulation in order to achieve specific properties and performance in the finished fabric. Another added benefit is the fact that the adhesive and the top coat can be formulated separately during actual coating application, depending on the end use. These additives do not influence the breathability of the coated fabrics.

Since both the adhesive and the top coat films are monolithic (non-porous), the coated fabrics are highly waterproof and windproof. Coated fabrics also have excellent barrier properties against other fluids.

Films of the adhesive and the top coat materials, both, have excellent elastomeric properties and as a result excellent stretchability and recovery. Elongation at break for these films is better than 500–600%.

An added advantage is the flexibility in the choice of the coating processes that can be used in applying these materials onto various fabrics, which include direct coating, transfer coating, lamination, dipping and spray coating. Due to this flexibility, these products can be coated on all kinds of substrates with ease. These include woven and non-woven fabrics, knit fabrics, melt blown substrates, leather and synthetic leather, etc. The weight of the coating to be applied onto the fabric can also be adjusted by the coater, depending on the application. Total thickness of the film applied can be varied from a fraction of a mil to several mils, as desired.

Due to their chemical structure and the molecular architecture, films of the top coat materials provide very soft and dry touch which is very important in many applications. Inherently they are very stable against thermal, oxidative, hydrolytic and ultraviolet degradation, which can be further improved by the use of additives. As a result, by proper coating formulation, they show excellent stability against repeated washing, drying, dry cleaning and even steam sterilization.

Breathable adhesive resin

Breathable adhesive resin is a segmented water vapor-permeable, waterproof polyurethane polymer consisting of at least three soft segments linked together with a diisocyanate. In some cases low amounts of a diol or diamine chain extenders is also incorporated into the system. Another unique feature of the adhesive resin is the fact that it has terminal hydroxyl groups which can be used to crosslink the system through the use of polyisocyanate or aziridine type crosslinkers. The chemical structure of the polyurethane adhesive resin is given below.

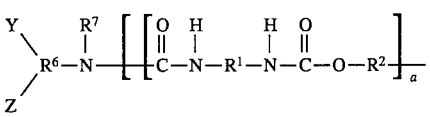

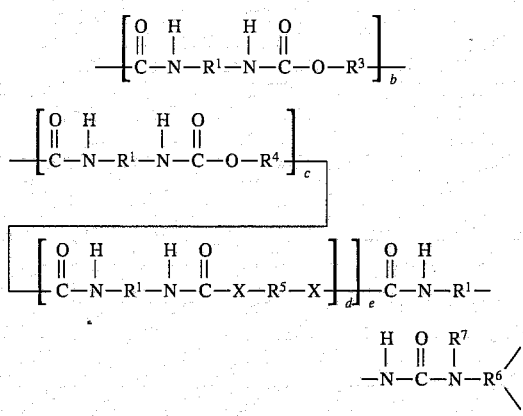

where
- $R^1$ is a bivalent aliphatic or aromatic hydrocarbon group which optionally may be substituted,
- $R^2$ is poly(ethylene oxide) of molecular weight 400 to 8000 g/mole,
- $R^3$ is poly(tetramethylene oxide), poly(propylene oxide), polybutadiene or polyisobutylene of molecular weight 500 to 3000 g/mole,
- $R^4$ is a polyester glycol (such as poly(butylene adipate), poly(neopentyl adipate), etc.) with a molecular weight of 500 to 3000 g/mole,
- $R^5$ is a bivalent aliphatic, linear or branched hydrocarbon having 2 to 20 carbon atoms,
- $R^6$ is a linear or branched hydrocarbon chain having 2 to 20 carbon atoms or an ether having 2 to 20 carbon atoms,
- $R^7$ is a hydrogen or an alkyl having 1 to 4 carbon atoms,
- X is an oxygen atom or

group where R is a hydrogen atom or an alkyl group having 1 to 4 carbon atoms,
- Y, Z represent a hydrogen atom or a hydroxy group, with the proviso that at least Y or Z is a hydroxy group,
- (a), (b), (c), (d), and (e) represent the average repeat units in the polymer backbone,
- (a), (b), (c), and (d) are numbers up to 10,
- (a), (b), and (c) each must be at least 1,
- (e) is a number up to 50.

Typical Adhesive Resin Composition

| Code | Mn (g/mole) range | Preferred Mn | Content in PU (% wt) | Preferred (% wt) |
|---|---|---|---|---|
| PTMO ($R^3$) | 500–3,000 | 1,000 | 30–60 | 30–35 |
| PEO ($R^2$) | 400–8,000 | 1,450 | 10–50 | 25–30 |
| PBA ($R^4$) | 500–3,000 | 1,000 | 10–40 | 10–20 |
| HMDI ($R^1$) | | | 8–25 | 18–22 |
| Chain extender (diol or diamine) ($R^5$) | | | 0–5 | 0–1 |
| DGA ($R^6$) | | | 0.5–2.5 | 1.0–1.5 |

The three preferred soft segments, their chemical structures and the properties they impart to the adhesive are described below:

Poly(tetramethylene oxide)glycol, PTMO or PTMEG or PolyTHF

Chemical structure $\quad HO-(CH_2CH_2CH_2CH_2-O)_{\overline{n}}H$, where $R^3$ being $\quad -(CH_2CH_2CH_2CH_2-O)_{\overline{n}}$.

PTMO is a hydrophobic polyol and is mainly used to provide good dry and wet strength (i.e., good mechanical integrity and hydrolysis resistance) to the coating during washing and also during regular use. PTMO may (partially or even completely) be replaced with poly(propylene oxide)glycol, polybutadiene glycols or polyisobutylene glycols.

Poly(ethylene oxide)glycol, PEO

Chemical structure $\quad HO-(CH_2CH_2-O)_{\overline{n}}H$, where $R^2$ being $\quad -(CH_2CH_2-O)_{\overline{n}}$.

PEO is a hydrophilic polyol, an important building block for breathable polyurethanes.

Poly(butylene adipate)glycol, PBA

Chemical structure $HO-(CH_2CH_2CH_2CH_2O-\underset{\underset{O}{\|}}{C}-CH_2CH_2CH_2CH_2-\underset{\underset{O}{\|}}{C}-O)_nCH_2CH_2CH_2CH_2-OH$, where $R^4$ being $-(CH_2CH_2CH_2CH_2O-\underset{\underset{O}{\|}}{C}-CH_2CH_2CH_2CH_2-\underset{\underset{O}{\|}}{C}-O)_nCH_2CH_2CH_2CH_2-O-$.

PBA, which is a polyester polyol, is used to provide improved adhesion properties to the system with minimal sacrifice in the hydrolytic stability. There are numerous other polyester polyols which can be used instead of PBA. These include but are not limited to polycaprolactone glycols, poly(neopentyl adipate)glycols, poly(butylglutarate)glycols, etc. In general, these polyester glycols can be composed of diols with 2 to 10 carbon atoms backbone (linear or branched) and diacids with 4 to 12 carbon atoms backbone.

Terminal hydroxy groups through the use of an aminoalcohol

The reactive $\alpha,\omega$-hydroxy end groups on these adhesive polymers are obtained through the termination of the reaction system (reaction of excess diisocyanate) with an aminoalcohol. Due to the much higher reactivity (several orders of magnitude) of amine towards isocyanate end groups, as soon as the aminoalcohol is added into the system, amine groups react with the isocyanate while yielding reactive hydroxy end groups, which can later be used for crosslinking.

The termination reaction also serves another purpose, namely, it can be used to control the molecular weight and as a result the viscosity of the final polyurethane(urea) system. This is quite different from the conventional methods of molecular weight control and production of reactive hydroxy end groups in such polyurethanes, which is usually obtained through the use of excess diols in the initial reaction mixture.

Depending on the type of aminoalcohol used, we can obtain polyurethane(urea)s with 2 or 4 reactive end groups, i.e., either $\alpha,\omega$-hydroxy (2 OH groups per chain) or $\alpha,\omega$-dihydroxy (4 OH groups per chain). Examples of aminoalcohols which give $\alpha,\omega$-hydroxy (one OH at each end) polyurethane(urea)s are:

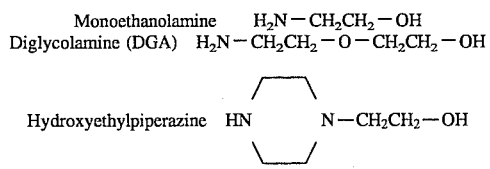

Examples of aminoalcohols which yield $\alpha,\omega$-dihydroxy (two OH at each end) polyurethane(urea)s are:
Diethanolamine
N-(3-aminopropyl)diethanolamine

Diisocyanates

During the preparation of breathable polyurethaneurea adhesive, the preferred diisocyanates are aliphatic because of their UV stability and weatherability. These include but are not limited to:

| | |
|---|---|
| 4,4-bis(isocyanatocyclohexyl)methane | HMDI |
| 1,6-hexamethylenediisocyanate | HDI |
| isophorone diisocyanate | IPDI |

Aromatic diisocyanates which can also be employed include, but are not limited to:

| | |
|---|---|
| p,p'-diphenylmethane diisocyanate | MDI |
| 2,4- and/or 2,6-tolylene diisocyanate | TDI |
| m- and p-tetramethylxylene diisocyanate | TMXDI |
| 1,5-naphthalene diisocyanate | NDI |

In spite of their poor UV resistance and weatherabilities, aromatic isocyanate based systems provide adhesives with good peel strength values due to their increased polarities.

As mentioned above, small amounts of a flexible diol or diamine chain extender, 0–5% by weight, can also be incorporated into the system if desired. Diol chain extenders include, but are not limited to: 1,4-butanediol, 1,6-hexanediol, diethylene glycol, triethylene glycol, propylene glycol, dipropylene glycol, etc. Diamine chain extenders include, but are not limited to: hexamethylene diamine, triethyleneglycol diamine, N-aminoethyl piperazine, bis(aminopropyl)piperazine, 1,3-pentanediamine, 2-methyl-pentamethylene-diamine.

Breathable top coat polymer

Breathable top coat is a linear segmented water vapor-permeable, waterproof polyurethaneurea polymer consisting of at least 4 soft segments PTMO, PEO and polycaprolactone-polydimethylsiloxane-polycaprolactone (PCL-PDMS-PCL) soft segments linked together with a diisocyanate (preferably aliphatic and preferably HMDI) and chain extended with a diamine (preferably 4 to 10 carbon atoms and branched). The molecular weight is controlled by the use of monoalcohols or monoamines.

Breathable top coat polyurethaneurea has the following chemical structure:

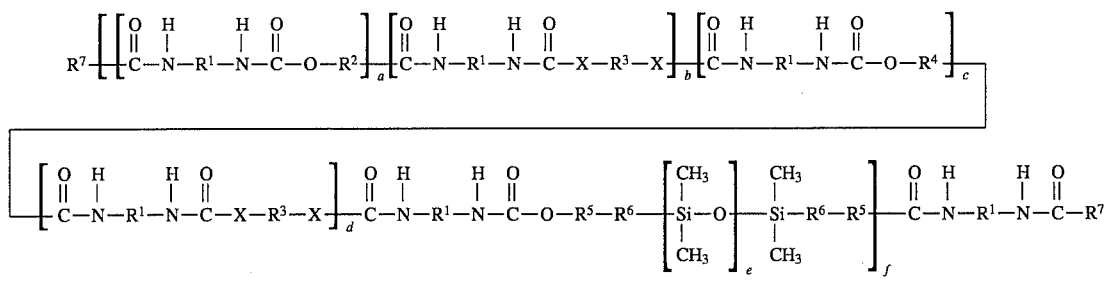

where $R^1$ is a bivalent aliphatic or aromatic hydrocarbon group which optionally may be substituted, $R^2$ is poly(ethylene oxide) of molecular weight 400 to 8000 g/mole, $R^3$ is an aliphatic linear or branched hydrocarbon having 2 to 20 carbon atoms, $R^4$ is a poly(tetramethylene oxide), poly(propylene oxide), polybutadiene or polyisobutylene with a molecular weight of 500 to 3000 g/mole, $R^5$ is a polycaprolactone segment with a molecular weight of 500 to 5000 g/mole, $R^6$ is an alkylenoxy group having 1 to 12 carbon atoms, $R^7$ is an alkoxy group having 1 to 20 carbon atoms or a substituted alkylamine such as dibutylamine, X is an oxygen atom or

group where R is a hydrogen atom or an alkyl group having 1 to 4 carbon atoms, (a), (b), (c), (d), and (e) represent the average repeat units in the polymer backbone, (a), (b), (c), and (d) are numbers up to 10, (a), (b), (c), (d) and (f) each must be at least 1, (e) is a number up to 300, and (f) is a number up to 10.

| Code | Mn range (g/mole) | Preferred Mn | Content in PU (% wt) | Preferred (% wt) |
|---|---|---|---|---|
| Typical Breathable Top Coat Polymer Composition | | | | |
| PTMO ($R^4$) | 500–3,000 | 2,000 | 25–50 | 30–40 |
| PEO ($R^2$) | 500–8,000 | 1,450 | 10–50 | 20–40 |
| PCL-PDMS-PCL | 1,500–20,000 | 7,000 | 1–15 | 4–10 |
| Butanol ($R^7$) | | | 0.5–1.5 | 0.5–1.0 |
| HMDI ($R^1$) | | | 10–35 | 20–30 |
| Dytek A ($R^3$) | | | 3–10 | 4–8 |

Soft Segments

As we have discussed in the previous section (Breathable Adhesive), PTMO provides good wet strength and mechanical integrity to the system. PEO again is responsible for the breathability if used in amounts around or more than 20% by weight. Presence of siloxane, chemically linked to the polymer backbone, provides softer touch and good surface properties to the resulting coating. It also has a compatibilizing effect in the final coating formulation (see coating procedures) where usually extra amounts of silicone fluids are added to the system to further improve the aesthetics and various other properties of the coating.

α,ω-Hydroxy terminated PCL-PDMS-PCL copolymers have the following chemical structures:

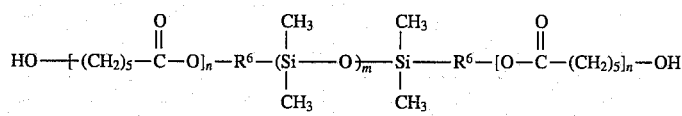

where (n) and (m) are variable usually between 5 and 300 and ($R^6$) is a short chain hydrocarbon moiety (1 to 12 carbon atoms) which may also contain oxygen and nitrogen in its structure.

Diisocyanates

Diisocyanates which can be used in this system are the same as the ones described in the adhesive formulation (both aliphatic and aromatic); however, for better UV stability and weatherability our choice will again be an aliphatic diisocyanate and preferably HMDI (HDI and IPDI or other aliphatics are also possible). Other benefits of the aliphatic isocyanates will be fewer side reactions (more control in the reaction) and also better solubility of the hard segments formed (due to their less rigid structure as compared with aromatic diisocyanates) when reacted with diamine chain extenders described below, in the reaction solvent (DMF), thus affording higher hard segment contents in the copolymer formed and higher solids contents in the final solution.

Chain extenders

Although both diol and diamine chain extenders can be used in the formulation of our breathable top coat polyurethane(urea), our choice is long chain having 2 to 20 carbon atoms and unsymmetrical (branched) diamines. Amines are preferred due to their much higher reactivities with isocyanates at low temperatures (e.g., room temperature) during the reactions and also better thermal, hydrolytic and mechanical properties imparted to the final product due to the formation of urea linkages (versus urethanes when diols are used). Long chain branched (unsymmetrical) diamines (such as 2-methyl-pentanediamine, Dytek A from DuPont) usually provide better solubility to the resulting copolymer, thus affording higher levels of hard segment content in the polymer backbone and also higher solids content in the final system (solution). This will not be possible with a low molecular weight, symmetrical diamine, such as ethylene diamine, due to its very compact and highly polar structure, which is usually the chain extender of choice in the patents discussed as the prior art.

Flexible diamine chain extenders include but are not limited to:

| | | |
|---|---|---|
| 1,3-pentanediamine | Dytek EP | DuPont |
| 2-methylpentamethylenediamine | Dytek A | DuPont |
| Triethyleneglycoldiamine | Jeffamine EDR-192 | Texaco |
| N-Aminoethylpiperazine | AEP | Texaco |
| 1,4-Bis(3-aminopropyl)piperazine | BAPP | Texaco |

Diols

Diol chain extenders include ethylene glycol, propylene glycol, 1,4-butanediol, 1,6-hexanediol, diethylene glycol, triethylene glycol, dipropylene glycol, etc.

Introduction of high hard segment content in the polyurethaneurea backbone is important in the final properties and performance of the coated fabric. Hard segment content of the polyurethaneurea usually controls the mechanical properties such as modulus and ultimate strength in addition to the thermal and hydrolytic stability of the finished coating.

Molecular weight control in the top coat polyurethaneurea is done by using calculated amounts of n-butanol in the original reaction mixture. Other monofunctional alcohols, such as n-octanol or monofunctional amines, such as dibutylamine, can also be used as molecular weight controlling agents.

Crosslinkers

Top coat and adhesive polymers described in the present application can be crosslinked (cured) by using isocyanates, aziridines or melamine based crosslinkers depending on the requirements of the field of application of the coated fabrics. Isocyanate crosslinkers that can be used in the coating formulations include both aromatic and aliphatic compounds. In terms of average functionalities, they can be difunctional or polyfunctional (more than 2 reactive groups per chain).

The preferred crosslinkers are either difunctional or polyfunctional aliphatic isocyanates, since they provide longer pot lives, better UV stability and weatherability to the finished coating and are colorless or slightly yellow compounds unlike most of the aromatic polyisocyanates, which are dark brown in color.

The amount of isocyanate crosslinker which needs to be used depends on the isocyanate content (equivalent weight) of the compound and varies usually between 0.5 and 10 parts per hundred parts of adhesive or top coat resin.

When aromatic isocyanates are used, due to their much higher reactivities, it may not be necessary to use a catalyst in the formulation. The experienced coater will easily be able to prepare formulations with any type of isocyanate crosslinker.

Types of icosyanates that can be used as crosslinking agents:

| | |
|---|---|
| Aromatic diisocyanates: | 2,4-TDI |
| | 2,6-TDI |
| | Mixtures of 2,4 and 2,6 TDI |
| | MDI, TMXDI and |
| | NDI which can also be used during the preparation of the adhesive and top coat materials |
| Aliphatic diisocyanates: | HDI, HMDI, IPDI |
| Aromatic polyisocyantes: | All listed below are Miles (Bayer) products: |
| | MONDUR series: |
| | CB-60, CB-75, CB-601, CB-701, IL, MR, MRS, MRS 2, CD, XP-743, XP-744, PF, E-448, E-489 |
| Aliphatic polyisocyantes: | DESMODUR Series: |
| | N-75, N-100, N-751, N-3200, N-3300, N-3390, Z-4370, Z-4370/2, XP-7014, LS-2550, KL-2550 |
| Blocked polyisocyantes: | DESMODUR Series: |
| | AP Stabil, CT Stabil, BL-3175 |

Equivalents of these or other isocyanate compounds from other manufacturers can also be used in the formulations as the crosslinker.

EXAMPLE 1

Preparation of a Breathable Adhesive Resin Based on HMDI, PEO, PTMO, PBA and DGA A reaction kettle purged with dry nitrogen and equipped with an overhead stirrer was charged with 4,698 g (4.77 mole) of PTMO, 5,133 g (3.60 mole) of PEO, 2,177 g (2.04 mole) of PBA and 2,827 g (10.72 mole) of HMDI and 3,460 g of DMF solvent. Reaction mixture was heated to 75° C. while being agitated and 2.25 g of a tin catalyst (Fomrez UL-28 from Witco) solution in 260 g DMF was added and the reaction was started. As the reaction proceeded, the system was diluted with 4,675 g of MEK and 4,010 g of toluene. After 3 hours of reaction a sample was removed from the system and analyzed for its isocyanate content. Titration showed 95.7% conversion. Remaining isocyanate was capped with 97.0 g of diglycolamine solution in 530 g of MEK. FT-IR spectroscopy confirmed the complete disappearance of the isocyanate groups. The reaction mixture was further diluted with 245 g of DMF, 345 g of MEK and 2,330 g of toluene.

Final solution had a solids content of 48.7% by weight (determined gravimetrically) and a viscosity of 87,000 cps at 21° C.

EXAMPLE 2

Preparation of a Breathable Adhesive Resin Based on HMDI, PEO, PTMO, PBA, BD and DGA A reaction kettle purged with dry nitrogen and equipped with an overhead stirrer was charged with 4,697 g (4.80 mole) of PTMO, 5,131 g (3.54 mole) of PEO, 2,174 g (2.04 mole) of PBA and 2,825 g (10.71 mole) of HMDI and 3,270 g of DMF solvent. Reaction mixture was heated to 80° C. while being agitated and 2.25 g of Fomrez UL-28 solution in 90 g DMF was added and the reaction was started. 15 minutes later 28.5 g of BD in 265 g of DMF was added into the reactor. As the reaction proceeded, the system was further diluted with 4,910 g of MEK and 5,820 g of toluene. Reaction was followed by FT-IR spectroscopy, monitoring the isocyanate peak between 2,270 and 2,260 cm−1. After 3 hours of reaction, remaining isocyanate was capped with 31.5 g of diglycolamine solution in 290 g of MEK. FT-IR spectroscopy confirmed complete reaction of the remaining isocyanate groups. The reaction mixture was further diluted with 645 g of MEK and 910 g of toluene.

Final solution had a solids content of 47.1% by weight (determined gravimetrically) and a viscosity of 125,000 cps at 23° C.

EXAMPLE 3

Preparation of a Breathable Adhesive Resin Based on HMDI, PEO, PNA and a Diamine Chain Extender A reaction kettle purged with dry nitrogen and equipped with an overhead stirrer was charged with 69.80 g (48.1 mmole) of PEO, 144.54 g (96.4 mmole) of PNA and 71.10 g (269.7 mmole) of HMDI. Reaction mixture was heated to 80° C. while being agitated and 0.04 g of a tin catalyst (Fomrez UL-28) was added and the reaction was started. Reaction was followed by FT-IR spectroscopy, monitoring the isocyanate peak between 2,270 and 2,260 cm−1. After 3 hours of reaction the system was diluted with a mixture of 50 g DMF and 250 g MEK and then chain extended with 8.70 g (118.1 mmole) of 2,2,4-trimethyl,1,6-diaminohexane solution in 250 g of MEK. FT-IR spectroscopy confirmed completion of the chain extension reaction by the disappearance of the isocyanate groups.

Final solution had a solids content of 35.8% by weight (determined gravimetrically) and a viscosity of 75,000 cps at 23° C.

EXAMPLE 4

Preparation of a Breathable Adhesive Resin Based on MDI, PTMO, PEO and PBA

A reaction kettle purged with dry nitrogen and equipped with an overhead stirrer was charged with 105.30 g (72.6 mmole) of PEO, 140.40 g (70.2 mmole) PTMO, 57.05 g (54.3 mmole) of PBA, 50.90 g (202.4 mmole) of MDI. Reaction mixture was heated to 80° C. and agitated. Reaction was followed by FT-IR spectroscopy, monitoring the isocyanate peak between 2,270 and 2,260 cm−1. During the reaction, as the system became thicker, it was diluted with 96 g of DMF, 135 g of MEK and 155 g of toluene. Reaction mixture was cooled down after 6 hours of reaction, when IR spectroscopy confirmed the complete disappearance of the isocyanate groups.

Final solution had a solids content of 47.2% by weight (determined gravimetrically) and a viscosity of 51,300 cps at 23° C.

EXAMPLE 5

Preparation of a Breathable Top Coat Resin

A reaction kettle purged with dry nitrogen and equipped with an overhead stirrer was charged with 3,500 g (1.78 mole) of PTMO, 2,850 g (1.95 mole) PEO, 620 g (0.087 mole) of a siloxane-caprolactone copolymer (Tegomer H-Si 6440 by Goldschmidt), 63 g (0.85 mole) n-butanol, 2,820 g (10.70 mole) HMDI and 5,100 g of DMF. Reaction mixture was agitated and heated to 75° C. At this temperature a solution of 1.50 of Fomrez UL-28 catalyst in 200 g of DMF was added into the reactor and the reaction was started. After 1 hour of reaction a sample was taken and titrated for its isocyanate content. Temperature of the reactor was also set to 50° C. Then the system was diluted with 3,560 g of DMF. Titration showed that 96.8% of the excess isocyanate charged into the system was still present in the reaction mixture (3.2% consumed due to side reactions). 727 g of Dytek A chain extender was dissolved in 1,750 g of DMF and added into the system slowly. During the chain extension, the system was further diluted with 6,655 g of DMF. At the end Dytek A addition, FT-IR spectroscopy confirmed the complete disappearance of the isocyanate groups.

Final solution had a solids content of 37.8% by weight (determined gravimetrically) and a viscosity of 61,000 cps at 23° C.

EXAMPLE 6

Preparation of a Breathable Top Coat Resin

A reaction kettle purged with dry nitrogen and equipped with an overhead stirrer was charged with 65.00 g (32.5 mmole) of PTMO, 75.00 g (51.7 mmole) PEO, 7.00 g (1.0 mmole) of a siloxane-caprolactone copolymer (Tegomer H-Si 6440 by Goldschmidt), 1.30 g (17.5 mole) n-butanol, 63.5 g (240.8 mmole) HMDI and 100 g of DMF. Reaction mixture was agitated and heated to 80° C. At this point 0.04 g Fomrez UL-28 catalyst was added into the reactor and the reaction was started. After 1 hour of reaction the system was diluted with 100 g of DMF and chain extension started by slowly adding a solution of 16.38 g of Dytek A in 100 g DMF. At the end Dytek A addition, FT-IR spectroscopy confirmed the complete disappearance of the isocyante groups. Then the system was further diluted with 110 g of DMF to reduce the viscosity.

Final solution had a solids content of 35.5% by weight (determined gravimetrically) and a viscosity of 57,500 cps at 23° C.

EXAMPLE 7

Characterization of Mechanical Properties and Moisture Vapor Transmission Rates of Adhesive and Top Coat Polymers In all textile coating applications, physical strength or mechanical integrity of the films and their moisture vapor transmission rates (MVTR) are the two most important parameters which determine the overall performance of these coatings. The third critical property is the adhesion of these films to various substrates (i.e., fabrics), or the peel strength of the coatings, which will be discussed in Example 8.

In actual coating applications (e.g., in textiles), the adhesive resins are crosslinked with isocyanates or others, such as melamine or aziridine based curing agents. This increases the strength and also improves the adhesion to fabric. Therefore, during our studies we have characterized adhesive films in the crosslinked state. In order to demonstrate the improvement in mechanical properties upon crosslinking, we also have films from Example 3 before and after crosslinking. The crosslinking formulation used is as follows:

| | |
|---|---|
| Adhesive resin | 100.0 parts |
| Crosslinker (Desmodur N 3390 from Miles Inc.) | 2.5 parts |
| Catalyst (Fomrez UL 28) | 0.1 part |
| Toluene (dilution solvent) | 40.0 parts |

Films with the above composition were cast on glass plate or on a release liner and cured for 4 hours at 120° C. before testing.

Table 1 summarizes various mechanical properties of the adhesive and top coat films. Moisture vapor transmission rate (MVTR) data on various films is provided in Table 2.

TABLE 1

| | Mechanical Properties of the Films | | |
|---|---|---|---|
| Sample Description | Young's Modulus (psi) | Ultimate Tensile Strength (psi) | Elongation at Break (%) |
| Adhesive Film (Example 1) Crosslinked | 410 | 1210 | 1025 |
| Adhesive Film (Example 2) Crosslinked | 420 | 1460 | 1120 |
| Adhesive Film (Example 3) | | | |
| Uncrosslinked | 460 | 720 | 1350 |
| Crosslinked | 940 | 4650 | 950 |
| Adhesive Film (Example 4) Crosslinked | 410 | 1290 | 1100 |
| Top Coat Film (Example 5) | 1900 | 3650 | 750 |
| Top Coat Film (Example 6) | 1550 | 3400 | 725 |

TABLE 2

Moisture Vapor Transmission Rates (MVTR) of Adhesive and Top Coat Films

| Sample Description | Thickness (mil) | MVTR (g/m²/24 hr) Inverted (ASTM E 96-80 BW) |
|---|---|---|
| Adhesive Film (Example 1) Crosslinked | 1.2 | 16,000 |
| Adhesive Film (Example 2) Crosslinked | 1.4 | 13,500 |
| Adhesive Film (Example 3) Crosslinked | 1.6 | 14,900 |
| Adhesive Film (Example 4) Crosslinked | 1.2 | 15,500 |
| Top Coat Film (Example 5) | 1.2 | 12,300 |
| Top Coat Film (Example 6) | 1.2 | 14,000 |

MVTR measurements were performed according to ASTM method E 96-80 BW (inverted cup method). Temperature was 22 ± 0.5° C. during the measurements.

EXAMPLE 8

Transfer and Direct Coating Formulations and Procedures

Before applying the adhesive and the top coat resins onto any substrate, they are usually compounded with various stabilizers and curing agents (and other specialty fillers as required) in order to improve stability, adhesion and other properties.

Typical coating formulations for the adhesive and the top coat materials which are used in the preparation of samples in Examples 9 and 10 are given below.

TABLE 3

Typical Adhesive Resin Formulation for Textile Coatings

| Ingredient* | Parts in Formulation |
|---|---|
| Breathable Adhesive Resin Solution (Example 1) | 100.0 |
| Polyisocyanate Crosslinker (Desmodur N 75 or N 3390) | 2.5 |
| Catalyst (Fomrez UL 28) | 0.001 |
| Thermal Stabilizer and Antioxidant (Irganox 1010) | 0.4 |
| Hydrolytic Stabilizer (Staboxol M) | 0.6 |
| Diluent Solvent for Transfer Coating (Toluene) | 100.0 |
| Dilution Solvent for Direct Coating (Toluene) | 25.0 |

TABLE 4

Typical Top Coat Resin Formulation for Textile Coatings

| Ingredient* | Parts in Formulation |
|---|---|
| Breathable Top Coat Polymer Solution (Example 5) | 100.0 |
| Polyisocyante Crosslinker (Desmodur N 75 or N 3390) | 1.0 |
| Thermal Stabilizer and Antioxidant (Irganox 1010) | 0.4 |
| Hydrolytic Stabilizer (Staboxol M) | 0.6 |
| Silicone Oil (Abil 10000) | 2.0 |
| Diluent Solvent (DMF) | 50.0 |

*Desmodur N 75, Desmodur N 3390 and Staboxol M are products of Miles, Inc., Pittsburgh, PA.
Fomrez UL-28 is a product of Witco Corporation, New York, NY.
Irganox 1010 is a product of Ciba Geigy Corporation, Hawthorne, NY.
Abil 10000 is a product of Goldschmidt Chemical Corporation, Hopewell, VA.

Transfer Coating Procedure

In this method, using a knife over the roll system, first a calculated amount of a solution of the top coat (sometimes also called skin) formulation (Table 4) was coated onto a release liner to yield a dry film of thickness between 10 to 40 microns. The solvent is evaporated in an air forced oven at 100° to 175° C. Onto this dry film, at the second knife station, a solution of the adhesive resin (sometimes also called tie coat) (Table 3) is applied to yield a dry film thickness of 7.5 to 40 microns. While the adhesive is still tacky, the fabric and the release paper (containing the polyurethane film) are passed through the lamination station (pressurized rubber rolls) and the polyurethane composite film is laminated onto the fabric. This laminate is passed through the second set of ovens (100° to 175° C.) to remove the solvent and also cure the system. In the final station coated fabric is separated (delaminated) from the release liner.

Transfer Coating Procedure for a Trilaminate

Trilaminate materials are sandwich structures which have fabrics on the outer sides and the breathable polyurethane layer between these two fabrics. The coating process has two steps. In the first step the fabric is coated as described above. After separation from the release liner, the coated fabric is rolled and mounted back to the second knife station. In the second step the adhesive solution is directly applied on top of the coated side of the fabric and then at the lamination station it is laminated together with uncoated outer layer fabric. The system is then passed through the drying/curing oven to remove the solvent and complete the curing. The trilaminate obtained is rolled and stored. The two outer fabrics used in such a trilaminate structure can be the same or different.

TRILAMINATES WITH ADHESIVE ONLY

In most of the coating applications it is necessary to use the adhesive and the top coat polymers as described in Example 8. However, in the preparation of trilaminate structures, which is also explained in Example 8 (using both the adhesive and top coat materials) it is also possible to achieve excellent results without the use of the top coat polymer. In this case first the adhesive formulation is applied onto the release liner, dried and partially cured, laminated onto the fabric, further dried and cured in the second set of ovens, and separated from the release liner. Then the coated and rolled fabric is mounted back to the coating line and the adhesive formulation is reapplied onto the coated side at the second knife station and then at the lamination station this is laminated with a new roll of uncoated fabric (either the same or a different type and make of fabric as the one used in the first pass). The trilaminate thus produced is passed through the ovens again, to dry and completely cure the system. In general, this approach of using only the adhesive may provide superior adhesion and a much softer hand to the product obtained because of extremely low modulus of the adhesive used.

Direct Coating Procedure

In the direct coating process, as the name implies, the adhesive solution is first directly applied (using a knife-over-roll system) onto the fabric to get a thin film (10 to 40 microns). Solvent is then removed and the adhesive is partially cured by passing it through an oven. In the second station the top coat formulation is applied onto this coated fabric (to yield a dry film thickness of 10 to 40 microns) and the system is dried and cured in the oven.**

**Notes: In order to reduce the penetration of the solvent and adhesive into the fabric, in the direct coating process the viscosity of the adhesive solution used is much higher than that of the transfer coating process (as indicated by the lesser amount of diluent in Table 3).

Oven temperatures and line speeds in the coating lines are adjusted depending on the design of the coating line (number of ovens and effective oven lengths) and the type (polyester, nylon, spandex, cotton, etc.) and nature (knit, woven, nonwoven, etc.) of the fabric to be coated. This is to ensure complete drying and curing of the coating without shrinking or otherwise affecting the fabric during the process.

EXAMPLE 9

Coated Fabrics, Their Moisture Vapor Transmission Rates and Peel Strengths

A wide range of coated fabrics were prepared by using direct or transfer coating procedures and tested for their performance. Table 5 lists the types of fabrics and the coating processes used in the preparation of the coated fabrics. In the transfer coating and the preparation of trilaminates, average coating thickness for the adhesive was about 12.5 microns and average thickness for the top coat was about 25 microns. In the direct coating the adhesive thickness was about 12.5 microns and the top coat was about 20 microns.

Moisture vapor transmission rates were measured according to ASTM method E 96-80 BW (inverted cup method) at 22°±0.5° C.

For peel strength measurements, a 1" polyester tape with hot melt adhesive backing was fused onto the coated side of the fabric at 325° C. by using an iron. The sample was cooled down to room temperature and aged for 24 hours. 180° C. peel strength values were obtained at room temperature using a Release and Adhesion Tester manufactured by Testing Machines Inc., Amityville, N.Y. Test (peel) speed was 12 minches per minute.

TABLE 5

Description of the Coated Fabrics, Their Moisture Vapor Transmission Rates (MVTR) and Peel Strength Values

| Fabric Description | Coating Procedure | MVTR (g/m/2/24 hr) | Peel Strength (lb/2 in) |
|---|---|---|---|
| Nylon Oxford 200 denier | Transfer | 9,400 | 9.90 |
| Nylon Oxford 200 denier | Direct | 4,500 | 15.30 |
| Polyester 70 denier | Transfer | 10,300 | 9.20 |
| Polyester (trilaminate) | Transfer | — | 5.40 |
| Nylon Taffeta | Transfer | 10,100 | 9.30 |
| Nylon Rip Stop 1.5 oz. weight | Transfer | 11,000 | 3.70 |

TABLE 5-continued

Description of the Coated Fabrics, Their Moisture Vapor Transmission Rates (MVTR) and Peel Strength Values

| Fabric Description | Coating Procedure | MVTR (g/m/2/24 hr) | Peel Strength (lb/2 in) |
|---|---|---|---|
| Nylon Rip Stop 1.5 oz. weight | Direct | 5,500 | 13.00 |
| Lycra-Spandex | Transfer | 9,700 | — |
| Polyester Fleece | Transfer | 10,800 | 5.50 |

EXAMPLE 10

Unsupported Films of the Top Coat Polymer

In certain applications, the top coat film alone is cast on a release liner for later use to laminate onto a fabric or substrate of choice by the application of heat or through the use of an adhesive as described above in Example 8. This is sometimes called an "unsupported film."

Preparation of the unsupported film or the film on release liner is the same as the one described in the first step of the transfer coating process of Example 8, where the top coat formulation is coated onto the release liner and dried by passing through the ovens. In this case, in order to get good mechanical integrity (and also depending on the application), a dry film thickness of 15 to 100 microns is needed. After completely removing the solvent (drying), the release liner containing the top coat film is rolled and shipped to the user (coater) where it can be laminated (coated) onto the desired substrate by the application of heat or an adhesive as described in Example 3 (transfer coating).

In some cases, depending on the requirement of the customer, it may not be necessary to use an isocyanate crosslinker in the formulation during the preparation of the unsupported top coat film.

While the invention has been illustrated and described as embodied in waterproof, moisture vapor permeable polymers, films and coated textiles and other materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is desired to be protected by Letters Patent is set forth in the appended claims.

We claim:

1. A water vapor-permeable, waterproof adhesive polymer of the formula

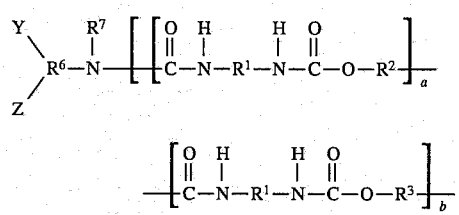

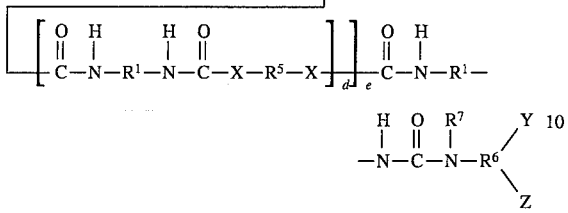

where

- $R^1$ is a bivalent aliphatic or aromatic hydrocarbon group which optionally may be substituted;
- $R^2$ is a bivalent poly(ethylene oxide) of molecular weight around between 400 to 8000 g/mole;
- $R^3$ is a bivalent poly(tetramethylene oxide), poly(propylene oxide), polybutadiene or polyisobutylene of molecular weight around between 500 to 3000 g/mole;
- $R^4$ is a bivalent polyester glycol with a molecular weight of around between 500 to 3000 g/mole;
- $R^5$ is a bivalent aliphatic, linear or branched hydrocarbon having 2 to 20 carbon atoms;
- $R^6$ is a bivalent linear or branched hydrocarbon chain having 2 to 20 carbon atoms or an ether having 2 to 20 carbon atoms;
- $R^7$ is a hydrogen or an alkyl having 1 to 4 carbon atoms;
- X is an oxygen atom or

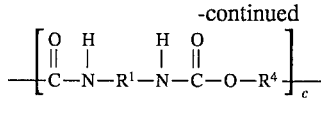

group where R is a hydrogen atom or an alkyl group having 1 to 4 carbon atoms;

Y and Z represent a hydrogen atom or a hydroxy group, with the proviso that at least Y or Z is a hydroxy group, (a), (b), (c), (d), and (e) represent the average repeat units in the polymer backbone;

(a), (b), (c), and (d) are numbers up to 10; and (a), (b), and (c) each must be at least 1;

(e) is a number of from 1 to 50.

2. The polymer of claim 1, wherein $R^4$ is poly(butylene adipate), poly(neopentyl adipate) or polycaprolactone.

3. A coating comprising as a principal ingredient the polymer of the formula of claim 1.

4. A film having a thickness of 15 to 100 μm consisting essentially of a polymer of the formula of claim 1.

5. A film having a thickness of 15 to 100 μm, consisting essentially of a polymer of the formula of claim 1 and between about 0.5 and 5% by weight of an organic polyisocyanate.

* * * * *